United States Patent [19]

Volz

[11] Patent Number: 5,294,904
[45] Date of Patent: Mar. 15, 1994

[54] VALVE BLOCK, IN PARTICULAR FOR SLIP-CONTROLLED HYDRAULIC BRAKE SYSTEMS

[76] Inventor: Peter Volz, In den Wingerten 14, 6100 Darmstadt, Fed. Rep. of Germany

[21] Appl. No.: 671,778
[22] PCT Filed: Jul. 13, 1990
[86] PCT No.: PCT/EP90/01149
§ 371 Date: May 16, 1991
§ 102(e) Date: May 16, 1991
[87] PCT Pub. No.: WO91/01907
PCT Pub. Date: Feb. 21, 1991

[30] Foreign Application Priority Data
Aug. 10, 1989 [DE] Fed. Rep. of Germany ....... 3926454

[51] Int. Cl.$^5$ .......................... H01F 5/00; F16K 31/02
[52] U.S. Cl. ............................. 335/299; 251/129.15; 336/92
[58] Field of Search .......... 335/299, 278, 202; 336/92, 96, 107, 192, 205; 251/129.15

[56] References Cited
U.S. PATENT DOCUMENTS
3,949,338 4/1976 Burson .................................. 336/92
4,898,360 2/1990 VonHayn et al. ............. 251/129.15

FOREIGN PATENT DOCUMENTS
1693312 2/1955 Fed. Rep. of Germany .
1915205 5/1962 Fed. Rep. of Germany .
393533 11/1965 Fed. Rep. of Germany .
2442457 3/1976 Fed. Rep. of Germany .
2504972 8/1976 Fed. Rep. of Germany .
2909768 9/1980 Fed. Rep. of Germany .
2938437 4/1981 Fed. Rep. of Germany .
3534665 4/1987 Fed. Rep. of Germany .
3543882 6/1987 Fed. Rep. of Germany .
3724218 2/1989 Fed. Rep. of Germany .
3727342 3/1989 Fed. Rep. of Germany .

Primary Examiner—Harold Broome
Attorney, Agent, or Firm—Dykema Gossett

[57] ABSTRACT

A valve block, in particular for slip-controlled hydraulic brake systems, includes a plurality of valve domes (10) incorporating magnet coils (1) and insulating casings cast around the magnet coils (1), as well as a contact carrier (2) containing a plurality of electric conductors (4), with the insulating material (10) encompassing the magnet coils (1) forming an integral unit with the contact carrier (2). The resulting design improves manufacturability, functional reliability, modular design flexibility and serviceability.

14 Claims, 3 Drawing Sheets

VALVE BLOCK, IN PARTICULAR FOR SLIP-CONTROLLED HYDRAULIC BRAKE SYSTEMS

INTRODUCTION

The present invention relates to a valve block, in particular for slip-controlled hydraulic brake systems according to the preamble of claim 1.

BACKGROUND OF THE INVENTION

A like valve block is known from patent application P 37 01 019.0. The external housing of the valve block is fixed on the valve block housing by a catch-type arrangement in this design, and the electric conductors and the magnet coils are soldered and are guided with a contact member designed as a multipoint plug in the housing cover to connect to a control unit. The requirement of a separate housing cover and soldering of the coils and the conducting paths have to be regarded as not favorable, since the comparatively great expenditure entailed for soldering the conducting path and the coils has adverse affects on manufacturing costs. Moreover, the complicated assembly of the large number of component parts, the risk of corrosion in the event of insufficient plug sealing and cover sealing as well as the insufficient heat emission through the housing cover and the heat expansion resulting therefrom are regarded as disadvantageous in the known conventional valve block design.

BRIEF DESCRIPTION OF THE INVENTION

Therefore, the present invention has for its object to improve upon a valve block of the species referred to initially to such effect that the aforementioned shortcomings are overcome and there is accomplished considerable simplification of the linkage technology, while the modular design is taken into consideration at the same time, as well as augmented ease of repair.

This object is achieved according to the present invention by the features characterizing patent claim 1.

An advantageous embodiment of this invention resides in compensating for fit-responsive and temperature-responsive variations between magnet coil and contact carrier by virtue of elastic linkages which permit to relieve the current conductors embedded in the elastic linkages from tensile load, preferably by way of small-surface resilient-tab-like or spider-type linkings.

Furthermore, it is provided by the subject matter of this invention to combine the insulating stuffing of the magnet coil in the yoke with the manufacture of the contact carrier by shaping the contact carrier out of the same insulating material in one working operation by plastic injection moulding.

Besides, the embodiment of the subject matter of this invention permits to position the current conductors on the magnet coils as desired in relation to the valve block housing—irrespective of their design, no matter whether cable, punched grid or wire—and to subsequently extrusion-coat them with the contact carrier in an anti-corrosion as well as tension-relieving manner.

Further features, advantages and possibilities of application of this invention can be gathered from the description of a plurality of drafted embodiments which will be described in more detail hereinbelow.

DETAILED DESCRIPTION OF THE PREFERRED EMBODIMENT OF THE INVENTION

Figure 1:
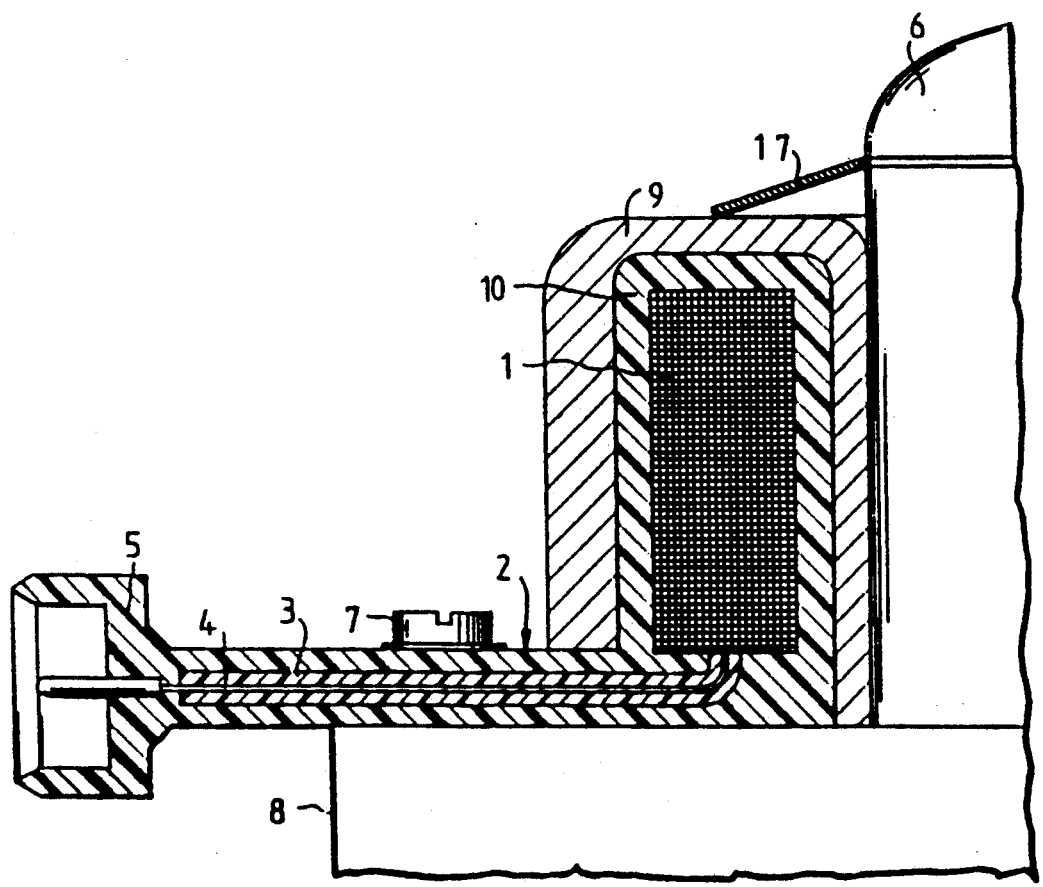
FIG. 1, is a partial cross-sectional view of the inventive valve block.

FIG. 1 shows a section of a valve block with a magnet coil 1 which is shown in partial cross-section, which is extrusion-coated by insulating material 10 in a yoke 9, with magnet coil wire designed as current conductor 4 extending out of the yoke 9 in direct linkage and being shaped to form a contact carrier 2 preferably in one working operation by being extrusion-coated with the insulating material 10. To fasten the contact carrier 2 on a valve block housing 8, preferably, there is provision of a retaining element 7 designed as a screw. It is also possible to effect securement of the contact carrier 2 by way of a retaining element 17 which is shrunk on a valve dome 6 and acts like a cup spring. Both variations are shown in the drawings.

Figure 2:
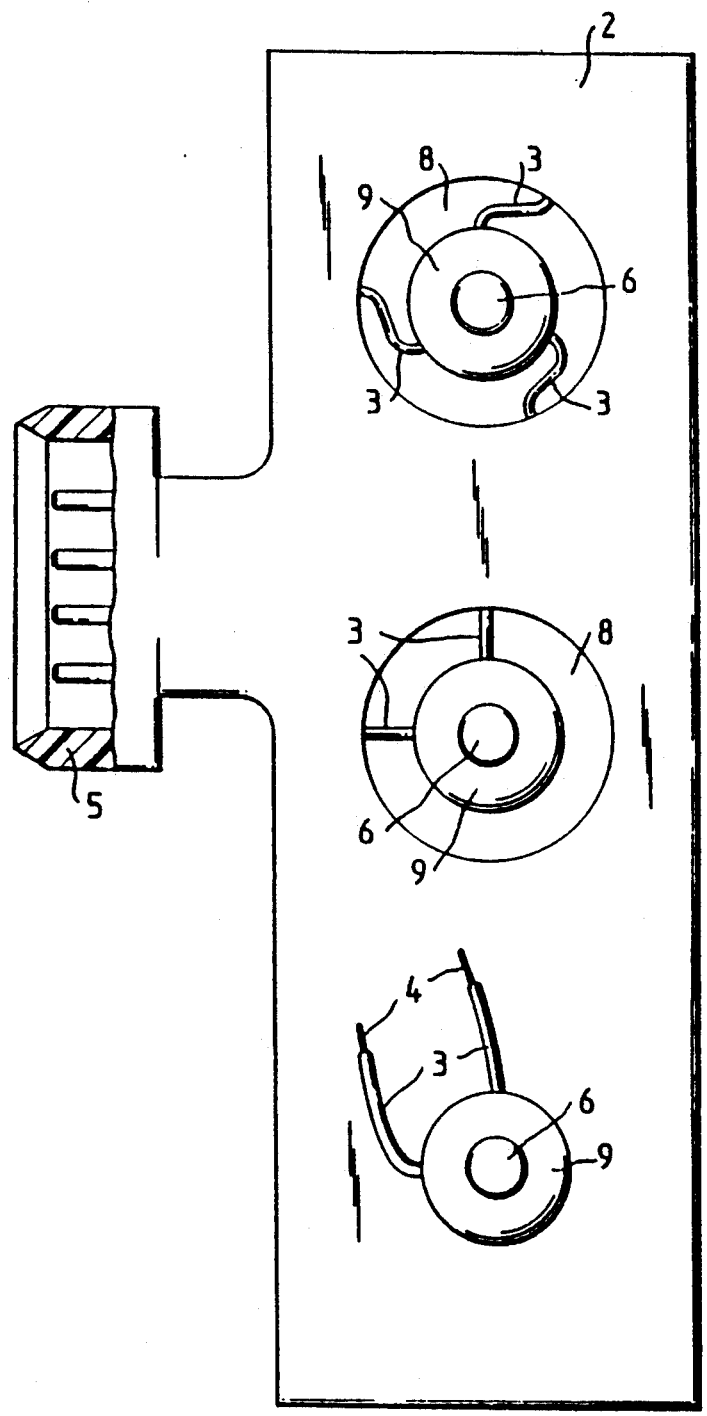
FIG. 2, is the top view on the valve block showing three designs of the linkage between contact carrier and magnet coil.

FIG. 2 shows the top view on the valve block housing 8 with the magnet coils 1 slid onto the valve dome 6, wherein alternatively three different embodiments of elastomeric linkage 3 for radially linking the current conductors 4 between the magnet coils 1 and the contact carrier 2 and finally also to a plug connection 5 are shown.

The first embodiment in FIG. 2 shows three electric current conductors 4 which are evenly distributed over the periphery of the magnet coil 1 and which are wound in S-type configuration for the purpose of unhindered elastomeric deformability in radial expansion relative to the magnet coil 1 so that in the event of different mechanical and thermal load there may be effected an uninhibited extension or shortening of the elastomeric linkages 3. The current conductors 4 are extrusion-coated with the plastic material 10 of the magnet coils 1 and the contact carrier 2, respectively.

The second elastomeric linkage 3 of the current conductor 4 between magnet coil 1 and contact carrier 2, which is shown by way of example in FIG. 2, is performed by separately insulated and untwisted lines, in consequence whereof safe attachment of the contact carrier 2 on the valve block housing 8 must be carried out by means of additional retaining elements 7.

In an alternative, the third embodiment of FIG. 2 shows the magnet coil 1 and the cable linkage of the current conductor 4 in any arrangement desired and extrusion-coated by the material of the contact carrier 2 so that there is no need for a special fixing of the contact carrier 2 vis-a-vis the magnet coil on the valve block housing 8. The contact carrier 2 is shaped as a plug connection 5 in the drawing on the left-hand side, the connections of the current conductor 4 projecting from the plug connection 5 being discernible.

Figure 3:
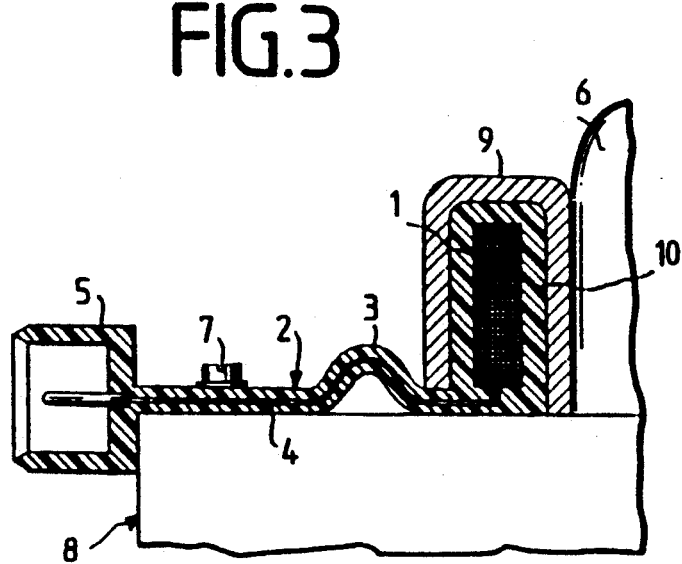
FIG. 3, is an alternative form of presentation showing the side view of the valve block with the inventive membrane-type linkage between contact carrier and magnet coil.

With reference to FIG. 1, FIG. 3 drafts a possibility of designing the elastomeric linkage 3 in the form of contacting the magnet coil 1 in a manner membrane-like twisted as shown in the side view, so that in the event of the valve block being subjected to mechanic or thermal load, there is ensured an expansion compensation and consequently a traction relief of the current conductor 4 embedded in the contact carrier 2.

Figure 4:
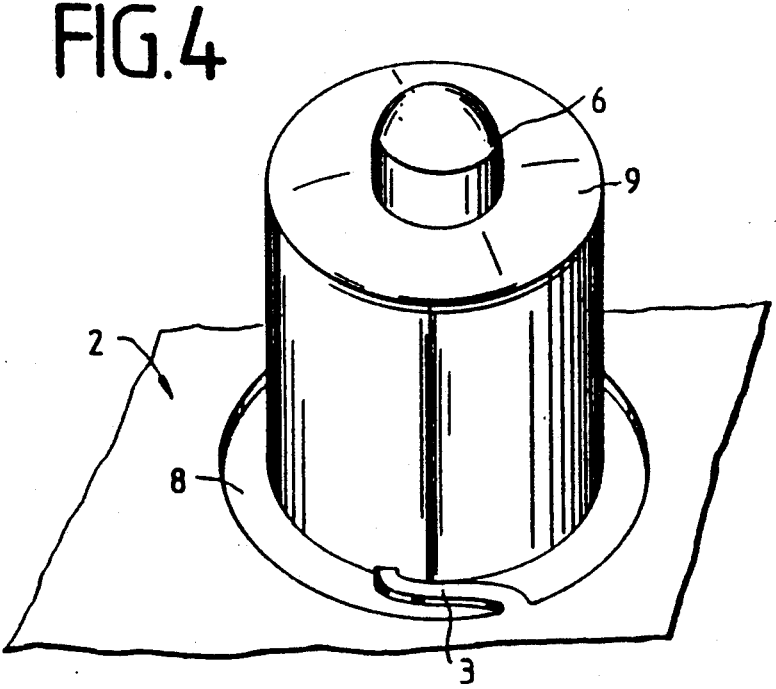
FIG. 4, is a spatial presentation of the spider-type or, respectively, S-shaped elastic linkage between the contact carrier and the magnet coil.

FIG. 4 shows in a spatial view the spider-type or S-shaped elastomeric linkage 3 of the current conductor 4 between magnet coil 1 and contact carrier 2 so that there is enabled an unhindered lateral length compensation of the elastomeric linkage in the event of length variation of the component parts.

What is claimed is:

1. A valve block for slip-controlled hydraulic brake systems comprising: a plurality of valve domes incorporating magnet coils with insulating material cast around the magnet coils; and a contract carrier containing a plurality of electric conductors, wherein the insulating material encompassing the magnet coils forms an integral unit with the contact carrier wherein the contact carrier is interconnected with the insulating material of the magnet coils by at least one elastic linkage whereby said interconnection is substantially independent of fit tolerances and temperature variations.

2. A valve block as claimed in claim 1, wherein the elastic linkage between the magnet coils and the contact carrier is a homogeneous constituent of the insulating material encompassing the magnet coils.

3. A valve block as claimed in claim 1, wherein the elastic linkage at least partially encases the electric conductors between the magnet coils and at least one plug connection adaptable connection with a control circuit.

4. A valve block as claimed in claim 1, wherein the electric conductors comprise a component part in the contact carrier which is formed by extrusion-coating and is electrically insulated as well as integrated.

5. A valve block as claimed in claim 1, wherein the electric conductors are composed of varnish-insulated wires positioned in at least planes in the contact carrier.

6. A valve block as claimed in claim 1, wherein the electric conductors are embedded as punched grid in at least one plane of the contact carrier.

7. A valve block as claimed in claim 1, wherein the contact carrier is positioned in axial direction relative to the valve domes' axis in any location desired in respect of the magnet coils fixed on the valve domes.

8. A valve block as claimed in claim 1, wherein the contact carrier is fastened on a valve block housing by means of an operatively connected form-locking retaining element.

9. A valve block as claimed in claim 1, wherein insulating stuffing in a yoke of the magnet coils and form material of the contact carrier are identical so that a homogeneous unit is constituted in one working operation by injection moulding.

10. A valve block as claimed in claim 1, wherein all connections of the electric conductors to the magnet coil are effected in radial extension by resilient-tab-like elastic linkages whereby, in the event of length variation of the parts, said linkages affect strain relief of the current conductor providing length compensation and a non-tension condition.

11. A valve block as claimed in claim 1, wherein the magnet coils and the valve domes are encompassed and confined on all sides by the contact carrier, the said contact carrier being attached to the valve block housing by at least one retaining element.

12. A valve block comprising:
a valve block housing;
a plurality of valve domes carried on said housing;
a coil concentrically disposed about each said valve dome, each said coil encased within insulating material;
a contact carrier composed substantially of insulating material integrally formed with said coil insulating material and containing a plurality of electric conductors interconnecting said coils with at least one circuit interface,
wherein at least of said coils is disposed in a spaced relationship with said contact carrier and at least one of said electric conductors resiliently bridges the two, and
wherein said bridging electric conductor is insulatively substantially encased within elastomeric linkage interconnecting said coil and contact carrier.

13. The valve block of claim 12, wherein said circuit interface comprises a plug connection including a plurality of electrically conductive contacts and a protector insulator integrally formed with and carried by said contact carrier.

14. The valve block of claim 12, further comprising at least one yoke, said yoke concentrically disposed with one of said valve domes and associated coil and coacting with said valve block housing to substantially enclose said associated coil and encasing insulating material.

* * * * *